(Model.)

4 Sheets—Sheet 1.

W. H. PRENTICE & S. H. BECKWITH.
INDIVIDUAL CALL FOR TELEPHONES OR OTHER CIRCUITS.

No. 264,843. Patented Sept. 19, 1882.

Inventors:
W. H. Prentice &
Sam. H. Beckwith
per Edw. W. Donn & Co. Atty.

Witnesses:
John A. mes
French Marston (Model.) 4 Sheets—Sheet 2.
W. H. PRENTICE & S. H. BECKWITH.
INDIVIDUAL CALL FOR TELEPHONES OR OTHER CIRCUITS.
No. 264,843. Patented Sept. 19, 1882.
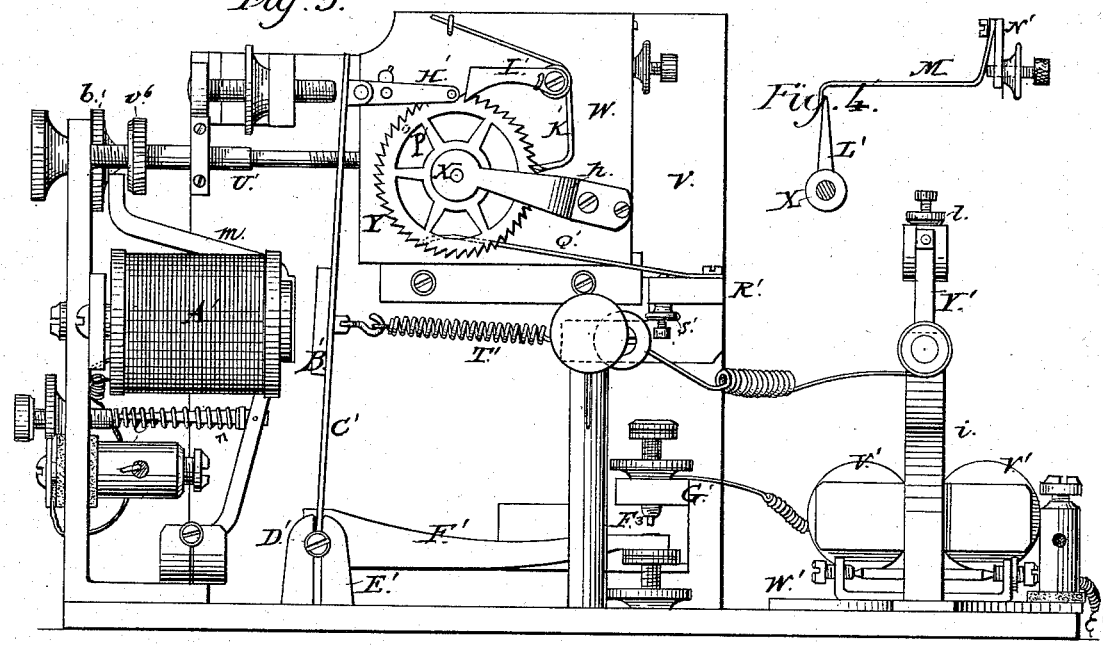
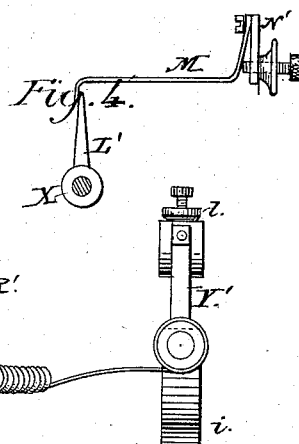
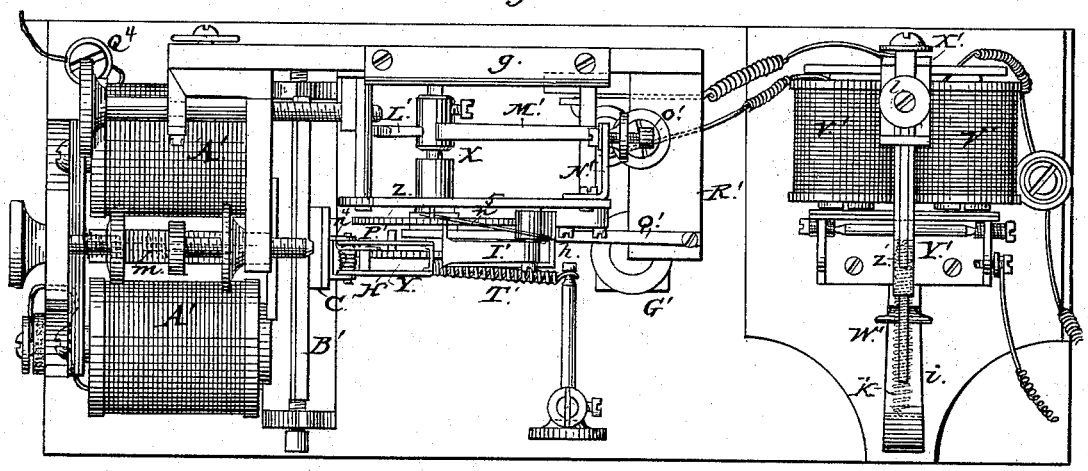
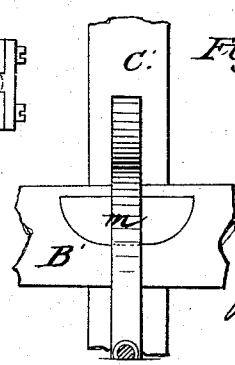
Witnesses.
John Ames
French Marston
Inventors:
Wm. H. Prentice and
Saml. H. Beckwith.
Per Edw. W. Donn & Co.
Attys.

(Model.)
4 Sheets—Sheet 3.
W. H. PRENTICE & S. H. BECKWITH.
INDIVIDUAL CALL FOR TELEPHONES OR OTHER CIRCUITS.
No. 264,843.                                    Patented Sept. 19, 1882.
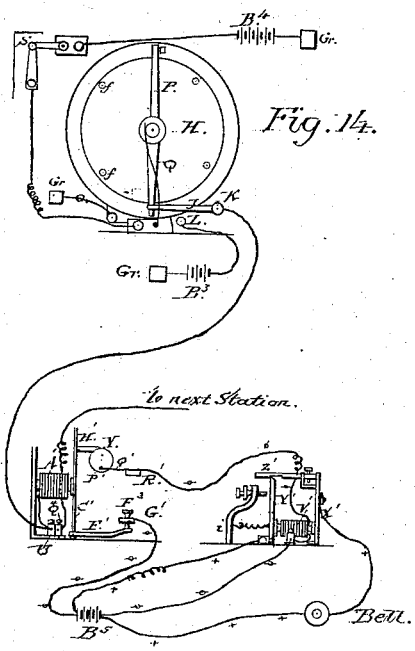
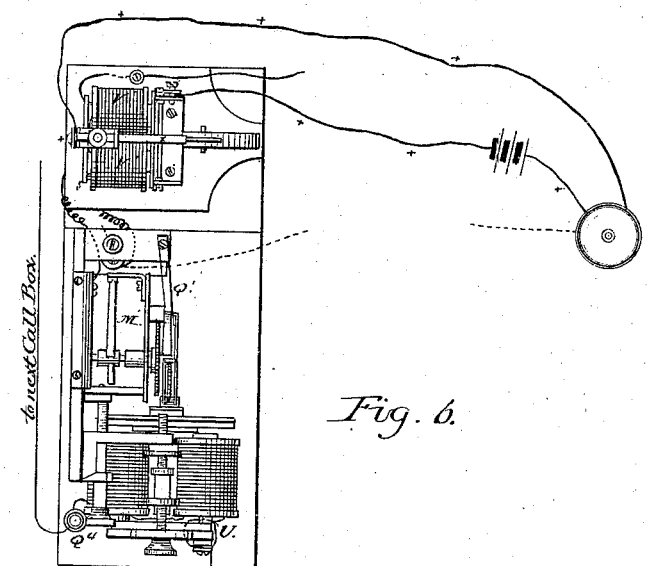
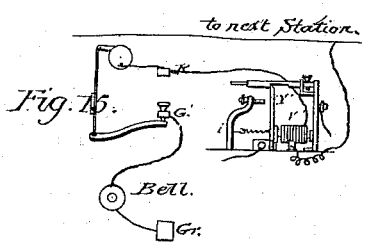
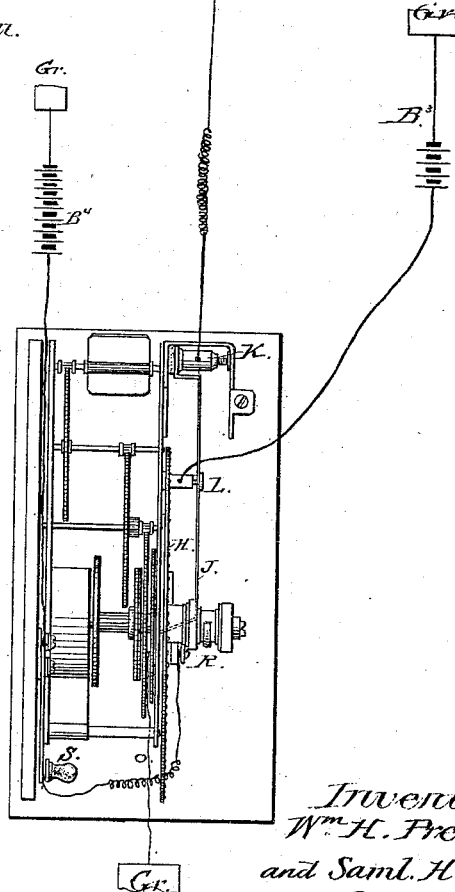
Witnesses:
John Ames
French Marston
Inventors:
Wm. H. Prentice
and Saml. H. Beckwith.
per Edw. H. Down & Co.
Attys.

(Model.)　　　　　　　　　　　　　　　　　　4 Sheets—Sheet 4.
W. H. PRENTICE & S. H. BECKWITH.
INDIVIDUAL CALL FOR TELEPHONES OR OTHER CIRCUITS.
No. 264,843.　　　　　　　　　　Patented Sept. 19, 1882.
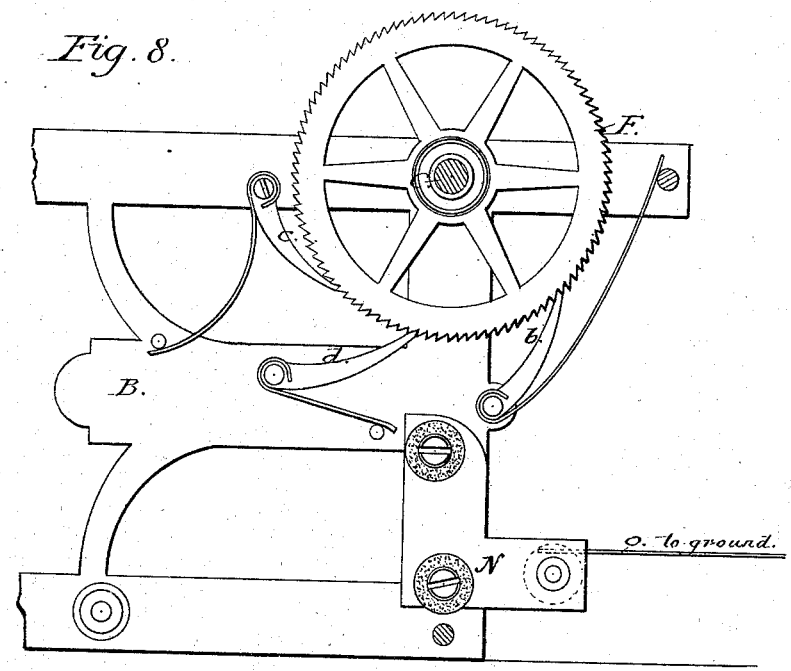
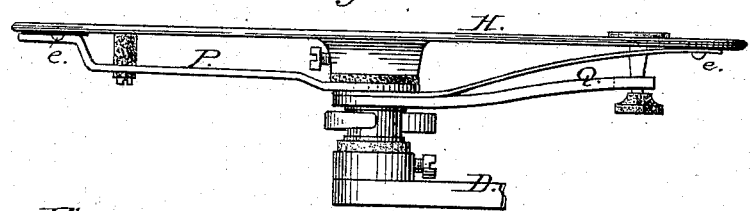
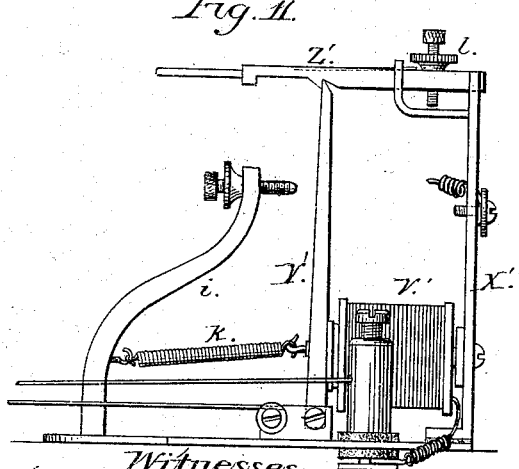
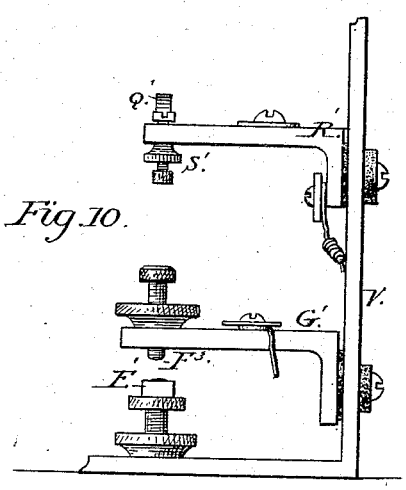
Witnesses:
Inventors:
Wm H. Prentice and
Saml H. Beckwith
per Edw. W. Donn &c.
Attys.

UNITED STATES PATENT OFFICE.

WILLIAM H. PRENTICE AND SAMUEL H. BECKWITH, OF UTICA, NEW YORK, ASSIGNORS TO FRANK J. CALLANEN, OF SAME PLACE.

INDIVIDUAL CALL FOR TELEPHONE OR OTHER CIRCUITS.

SPECIFICATION forming part of Letters Patent No. 264,843, dated September 19, 1882.

Application filed October 11, 1881. (Model.)

*To all whom it may concern:*

Be it known that we, WILLIAM H. PRENTICE and SAMUEL H. BECKWITH, of Utica, in the county of Oneida and State of New York, have invented certain new and useful Improvements in Individual Calls for Telephone or other Circuits; and we do hereby declare that the following is a full, clear, and exact description of the invention, which will enable others skilled in the art to which appertains to make and use the same, reference being had to the accompanying drawings, and to letters of reference marked thereon, which form a part of this specification.

Our invention is an improvement in individual call systems for use on telephone or other circuits where it is desirable to signalize any particular one of a series of stations on the same circuit without giving signals at any of the intermediate stations or those beyond the one desired.

It consists, generally speaking, of an individual call-box located at each station in the circuit to be operated and a combination automatic switch or transmitter which, when set in motion, sends a current of electricity impulsively over the entire circuit at regular intervals, causing a uniform effect on each of the individual call-boxes. The transmitter or switch is designed for the exchange or central office from which call-signals are to be given, and it may be used on a number of different circuits successively.

Figures 1, 7:
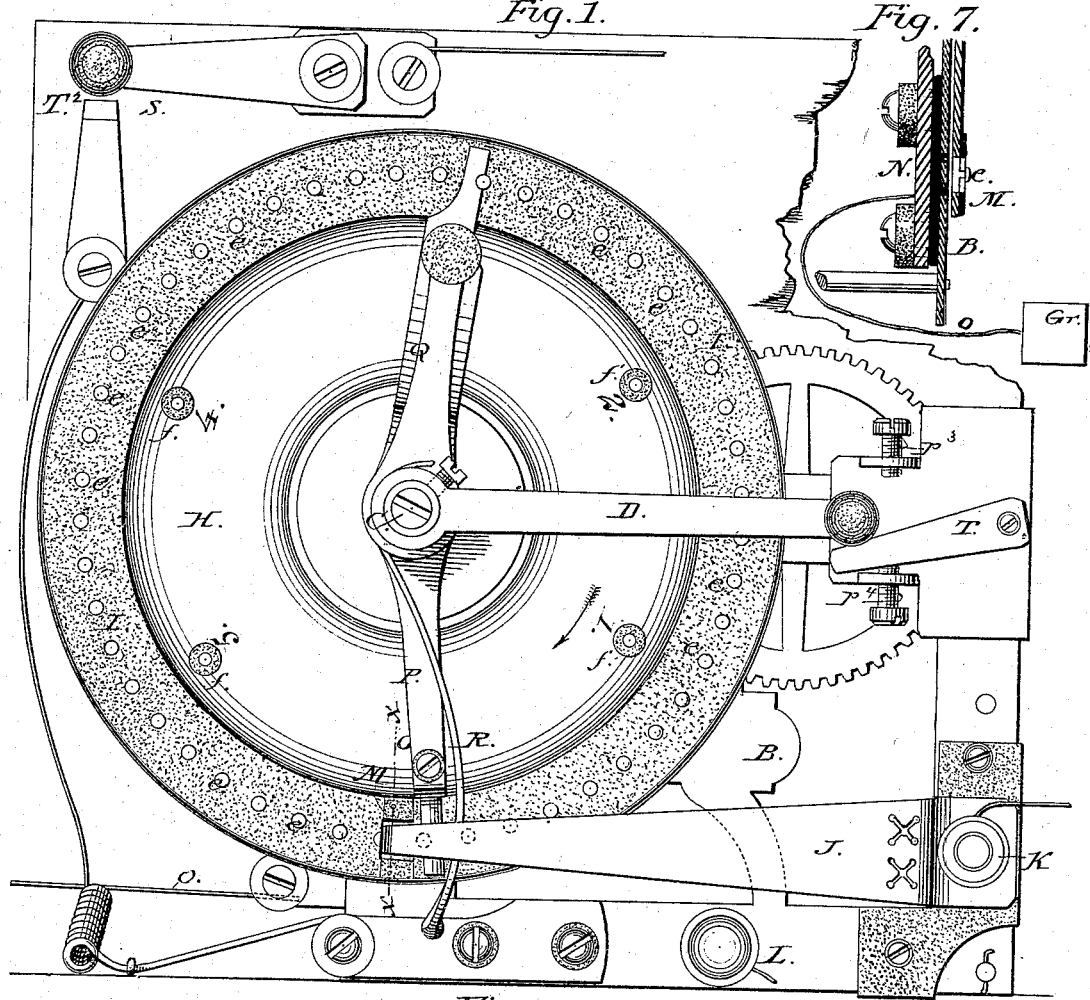
Figure 2:
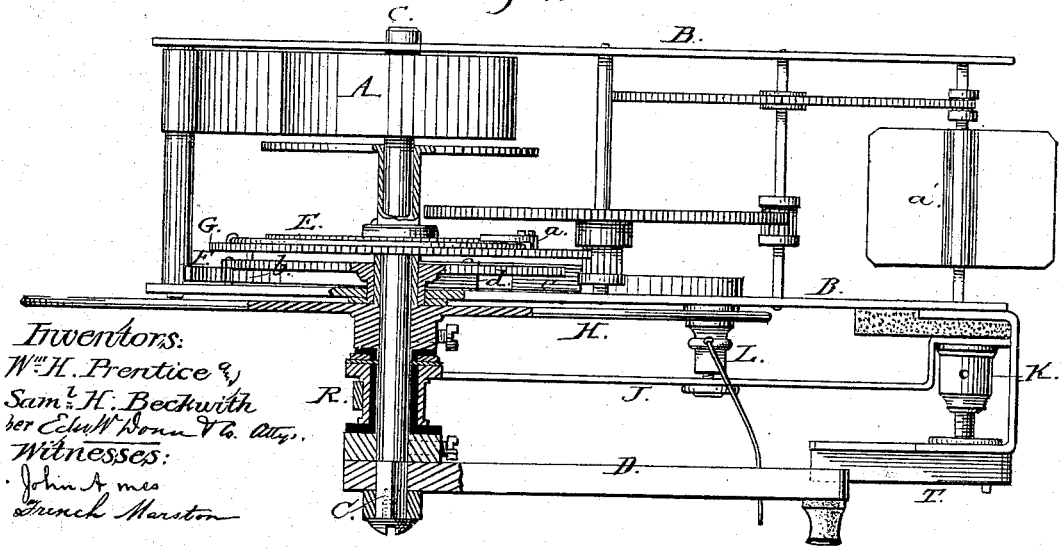

Figure 1 is a front elevation of the transmitter. Fig. 2 is a plan or sectional view of the same. Fig. 3 is a front elevation of the receiver or call-box. Fig. 4 is a detail of the locking-arm. Fig. 5 is a plan or top view of the call-box. Fig. 6 is a plan showing the relation of call-box to transmitter. Fig. 7 is a detail of insulated plate N. Fig. 8 is a detail of a part of transmitter, showing triple pawls. Fig. 9 is a detail of the armature-bar and cushion arrangement for same in call-box. Fig. 10 is a detail showing brackets R' G', &c. Fig. 11 is a side elevation of the locking device for bell-circuit. Fig. 12 is an elevation showing screw and housing for adjusting the frame which supports the ratchet mechanism. Fig. 13 is a top view, showing the spring switch-arm Q. Fig. 14 is a diagram showing the circuits closed to bell-battery from the transmitter and through the call-box. Fig. 15 is a diagram showing the independent circuit to bell.

Referring to drawings, A is a spring such as is used in ordinary clock mechanism, attached to a metallic frame, B, and also to a post or arbor, C, to which is attached a key or crank, D, used to wind said spring for work. There are two ratchet-wheels provided to act in connection with said spring, one, E, of which is attached permanently to the arbor C, and the other, F, is fixed loosely thereon.

G is a main driving-wheel fixed loosely on the arbor C, which has attached to it a pawl, *a*, which engages the teeth of the fixed ratchet-wheel E and directly prevents the recoil of the spring A while winding. The teeth of the second ratchet-wheel, F, are engaged by the three pawls *b c d,* pivoted to the metallic frame, which serve to prevent any lost motion or back-set which would cause derangement of electrical connections dependent upon the movement of the main wheel G. The several pawls are provided with the usual and necessary springs to insure their engagement with their respective ratchet-wheels. On the arbor or main shaft C is loosely fixed the spur-wheel G, which is locked to said shaft by the pawl and ratchet-wheel first mentioned, and when so locked, during the movement of the impelling-spring, drives through a train of wheels and pinions a regulating fly or fan, *a'*, to give regularity of movement to a disk to be mentioned.

Immediately outside of the frame B is a metallic disk, H, keyed to the arbor or main shaft by a suitable set-screw, which forms a direct connection through said shaft with the frame mentioned. Around the edge of the metallic disk is an annular ring, I, of insulating material, through which protrude frontward forty-eight metallic points or pins, *e*, which connect with the metal of said disk. A strap spring-arm, J, is fixed to the frame of the transmitter by a binding-post, K, which spring, however, at this point has no metallic connection with said frame B. This spring-arm extends from its point of security within reach of the disk, and during the movement of said disk with the arbor or main shaft is brought successively in connection with the forty-eight metallic pins previously mentioned.

The spring-arm J is connected with the main wire out, while the metallic points in the disk, which move under the spring, connect with the metallic frame of the transmitter through the arbor C, thence to a binding-post, L, which connects with the conductor from a light auxiliary battery, B³, and through this battery to the ground. When the disk H has made one complete revolution the strap spring-arm J from the main wire will have been passed by each of the metallic pins of the disk, and at the moment the revolution is complete the bent end of said spring drops through an opening or slot, M, in said disk onto an insulated plate, N, Fig. 7, which connects with a ground-wire, O, Fig. 6. There are two insulated arms on the arbor or main shaft of the transmitter, each of which has its end bearing on the face of the ring of the metallic disk. One of the arms, P, is stationed in position on said disk, so as to connect with the spring-arm J shortly after said spring rides out of the slot M onto the insulating-surface of the annular ring. The other arm, Q, is adjusted and fixed from time to time by a catch-pin, which is snapped by a spring into insulating-eyelets $f$ in the disk, the end of said spring being each time in position to pass under the spring-arm J as said arm Q is carried around with the movement of the disk. Both of these arms on the arbor are insulated from the same, as stated, but connect with each other and also with the heavy battery B⁴ through a curved friction-spring, R, which clasps and bears on the sleeves of said arms. This spring R is based upon a plate, which is insulated from the metallic frame of the transmitter. The wire from this plate is carried to the back of the case, and thence through a switch, S, to the main battery, and thence to the ground. When the disk H has made one revolution and the end of the spring-arm J falls into the slot M the driving spiral spring A is prevented from carrying it any farther by a pivoted stop-lever, T, against which the crank-arm D is carried and rests at each time on its return. When the transmitter is to be set in motion the crank D must be revolved backward until its end comes in contact with said pivoted stop T, and presses it up until it bears against an adjusting-screw, $p^3$, intended to limit the motion to an exact revolution. A corresponding screw, $p^4$, opposite to that mentioned, limits the movement of the crank in unwinding. The hand of the operator being removed from the handle of the crank D, the disk H, by force of the spiral spring, will be carried through a complete and exact revolution. At the beginning of the movement of the disk the ground-connection is cut off by means of the spring-arm J, which rides up out of the slot M in the disk.

The transmitter just described is operated as follows: The end of the spring-arm J being through the slot M of the disk H and the current grounded through the wire O, we move the crank-arm D backward or to the left a complete revolution to wind the driving-spring A. The moment the said crank-arm is released the disk H is moved by force of the spring A and the spring-arm J lifted to the face of the insulating-ring I. The fixed arm R, coming in contact with said spring-arm J, establishes metallic connection with the battery B⁴ (see Fig. 6) to produce extra force and start the movement of the ratchet-and-pawl mechanism of the call-box, as will be hereinafter described. The pins $e$ of the disk, as they successively pass under and from under the spring-arm J, close the circuit to battery B³ and open the same, thus producing a succession of impulses for the call-boxes located at stations on the line. When the arm Q passes under the spring-arm J battery B⁴ is again switched into to give additional force to complete the circuit to the secondary magnets for the call-box, as will be hereinafter set forth. The train of wheels beginning with G and ending with the shaft on which the fly $a'$ is fixed serve to give an even movement to the rotating disk, and the tendency to back-throw to said disk is prevented by the pawls, which engage the ratchet-wheel E, secured to the shaft C.

The main wire above referred to passes from the binding-post K on the end of the spring-arm J to the first station outside, where is placed an insulated binding-post, U, of an individual call-box, which may be described as follows:

Based upon a suitable block is a heavy frame, V, on which is fixed guides or ways $g$ to receive the back plate of a metallic frame, W, which slides horizontally therein and carries a ratchet-and-pawl and other mechanism, to be described. This frame W is composed of front and back plates properly pinned together. A shaft, X, runs transversely through this frame and is journaled in said back plate, and a bracket, $h$, firmly fixed to the front plate. Upon this shaft, in front, are fixed two wheels, the one, Y, a ratchet-wheel of common form and the other, Z, an escapement-wheel, both having teeth of a number corresponding with the number of points or pins in the face of the transmitter previously described.

At a suitable point on a vertical wall of the heavy frame V is fixed a set of electro-magnets, A', and in front of the same is an armature, B', fixed to a broad spring-plate, C', influenced by a retractile spring, T', which forms the armature-bar. This armature bar or plate is fixed upon a shaft, D', properly journaled in trunnion-bearings in a plate, E', fixed to the base-plate of the frame V. At right angles to the armature-bar, and connected with the same, is an arm, F', which extends horizontally, its free end playing under the influence of the magnet between adjustable set-screws fixed in said frame V, and an insulated bracket, G', provided with a binding-screw and washer.

Attached to the spring-plate C' at its upper end, and pivoted thereto, is a pawl, H', which engages the teeth of the ratchet-wheel Y, and when under the influence of the current draws said ratchet-wheel toward the electro-magnets A' one tooth at a time. A second pawl, I', pivoted to the adjustable frame W, also engages the ratchet-wheel and prevents back or recoil movement. This second pawl at each impulse engages also the escapement-wheel, and a pallet, K', attached to and moving with it in alternating strokes, prevents the ratchet-wheel from being revolved by the reciprocating pawl more than one tooth at a time. Both of these pawls mentioned are held to gear with the wheels by suitable spiral springs, $n^4$ $n^5$.

The shaft X, forming the axis of the ratchet and escapement wheel, has fixed adjustably upon it by means of a sleeve and a set-screw a radial arm, L', adapted to engage at stated intervals a spring-arm, M', bent at the end downward, which is fixed to a bracket, N', projecting inward from the frame W, and by its tension serves to stop or check the rotation of the ratchet-wheel until acted upon by an additional force of battery-current, as will be hereinafter fully set forth. This holding-spring M' may have its tension regulated by a set-screw and threaded washer, O', in an angle-plate to which said spring-arm is attached.

Inside of the ratchet-wheel, at a proper point, is fixed a pin, P', which bears in its location a relative position to the starting-point of the ratchet-wheel that the insulating-eyelets on the disk of the transmitter do to the starting-point of said disk, both being fixed to suit the respective stations. This pin P', when it has traversed a certain segment of its revolution, comes in contact with a spring-arm, Q', fixed to the upper insulated angle plate or bracket, R', attached to the frame V of the call-box. This spring-arm has its tension regulated by a set-screw and washer, S'. The bracket R' is fixed to the frame V; but it is insulated therefrom, and has two binding-screws and washers for connecting-wires. The lower bracket, G', is also insulated from the frame V, and it is provided with one binding-screw and washer for a connecting-wire. At the end of this latter bracket is a platinum-tipped adjustable set-screw and washer, which screw forms the contact-point with the end of the arm F', which is also platinum tipped.

The frame W is adjustable horizontally in the frame V by means of a thumb-screw, b, which runs through and is collared by an angle-plate fixed to said frame V, and works in a boss fixed to the back plate of the said frame W. The object of this horizontal adjustment is to bring the ratchet-wheel in proper relation to the pawl pivoted onto the armature bar or plate C' to insure proper engagement.

Nearly adjacent to the mechanism of the call-box just described is a second set of electro-magnets, V', and an armature fixed to an upright armature-bar, Y', pivoted in suitable trunnion-bearings provided in an angle-plate fixed upon a frame, W'. At the back of said frame is an upright post or plate, X', which forms a support to said magnets, and to which is pivoted at its upper end a lever, Z', provided with an adjustable set-screw, l, and a flat spring on its upper edge. This horizontal lever passes through a slot in an angle-plate bracketed from the post X', and rests normally with its set-screw l bearing upon said angle-plate. The lever Z' has a notch on the under side, which engages the end of the armature-bar Y' when the armature is attracted to the electro-magnet and locks said armature to the influence of the current, which completes the bell-circuit. To the frame W' is secured an upright curved arm, i, provided on its end with an adjustable set-screw, which limits the back-throw of the armature-bar while a retractile spring, k, withdraws the said armature-bar and armature when the circuit is open. The lever Z' is limited in its upward movement by the upper wall in the slot of the bracket attached to upright X', and in its downward movement by the set-screw l.

Beneath the main electro-magnet A' an auxiliary adjusting-bar, m, is hung in suitable trunnion-bearings fixed upon the frame V, which rises upward curving in the form of the letter S. It has a broad plate fixed at a point immediately in rear of the armature B', against which said armature strikes as it nears the face of the magnet. A spring, n, is attached to this curved bar to govern its resistance, said spring having its tension regulated by an adjustable set-screw in the frame V. This bar m terminates near the upright of the frame V in rear of electro-magnets A', where it is turned up so that its end strikes against the head of an adjustable set-screw fixed in said upright when thrown forward by the tension of the spring n.

The operation of our call system is as follows: We will suppose that the spring-arm J is through the slot M of the disk H and the current grounded, the crank being in position on the stop-lever T and the arm Q set to number 3 on the disk. The crank is carried backward to wind the impelling-spring A until it makes a complete revolution, throwing up the said stop-lever against its upper limiting-point. The disk being locked to the arbor by the ratchet arrangement described, when the crank is released the force of the spring revolves the disk to the right at an even and regular speed. At the beginning of this movement the end of the spring J is lifted out of the slot H over the insulating-surface of the same. The first pin passes under said arm and establishes connection with the call-box to start the same, and in order to give additional impulse the arm P rides under said spring-arm J and immediately establishes connection with or switches on additional battery $B^4$ through the said arm P and spring R without breaking the circuit, to draw the armature C' forcibly toward the magnets A' to release the ratchet-wheel or unlock the same, which was held to a normal position of unison by the arm L', which was in turn held by the spring-arm M'. After this release the additional battery $B^4$ is insulated out by arm R passing out of contact with spring-arm J, and there is an alternate closing and opening of the circuit of the light battery as the pins and insulating-surface of the disk ride under the spring-arm J, thereby producing a succession of electric impulses on the main line during the revolution of the disk. When the spring-arm Q reaches the strap spring-arm J of transmitter the pin P' of the ratchet-wheel of the call-box will have come in contact with the spring Q'. Now, to complete the circuit to the secondary magnets V' the said spring-arm Q' switches on additional battery, as previously mentioned, to overcome the resistance of the plate or armature-bar C' and complete the circuit by springing the armature B' up against the cores of the primary magnets and carrying the arm F' up against the set-screw F³ above its end. The plate C', which forms the armature-bar of the primary magnets, is made purposely light and springy, so that it will yield, after its upper end has come in contact with the set-screws, to the influence of the extra battery force and allow the armature to come in contact with the poles of said electro-magnets without disturbing the relative position of the drawing-pawl H', the purpose being to complete the circuit to the secondary magnets through the movement of the arm F', or start the call-box by disengaging the arm L' from the spring M'.

The bells used with our call-boxes are such as continue to ring, after being started, by an automatic circuit-breaking arrangement, and they are connected by conducting-wires to the secondary magnets, and indirectly with the armature of the same. When the circuit is closed to the secondary magnets it is held so closed by the horizontal lever Z', which engages the end of the armature-bar Y' and keeps the bell ringing through the agency of the bell-battery shown in Fig. 6 until said lever Z' is raised to open the bell-circuit. When the ringing has been accomplished the ringing-arm Q passes from under the spring-arm J of the transmitter, and moves on, causing the impulses to continue the movement of the ratchet device of the call-box until the complete revolution is made and the starting-point again reached, with the light battery-current grounded ready for the next call.

The pressure-bar m, with its wide plate, and the adjusting-spring which cushions it are used to prevent convulsive action of the armature while it is being drawn up, avoiding the adjusting-spring until the armature is very near the magnets, and to insure prompt action in throwing the armature back with force. This arrangement prevents false alarms to a box not intended to be called, which might occur from slight variation in the strength of the light battery-current. It gives the armature a steadier movement, and the wide pressure-plate prevents the armature from twisting the armature bar or spring toward one more than the other of the magnets.

The button-switch T² on the back of the case of the transmitter is used to disconnect the battery governing the unlocking and ringing connections, which enables the operator to correct any displacement of any of the working ratchets. This is accomplished as follows: When the transmitter is wound up and sent around with only the light battery in action all boxes which have been brought to the proper point to begin the next call will remain in that position, held by the locking-arm, while any which may have been thrown or moved out of place will be brought to a similar position, where they will remain until the transmitter is put in operation for a call.

The circuit to the primary magnets of the call-box is made by a conducting-wire connected at a point, K, of transmitter and post U of the box, thence through magnets A' and on to next call-box in main line. The circuit to magnets V' which locks the bell-circuit is made through lever F', spring-bar C', pawl H', ratchet-wheel Y, pin P', spring Q', thence through said magnets V' to local battery B⁵, thence through said battery to bracket G' and screw F³. When extra battery force is switched on for a call the armature B' is drawn to the cores of the magnet A', and the arm F' closes this circuit, (see Fig. 14,) and through the said magnets V' the bar Y' is locked to the horizontal lever Z'. The independent bell-circuit is then made through upright X', lever Z', armature-bar Y', and thence to battery B⁵, through said battery to bell, it being completed at binding-screw of said upright X'. (See Fig. 14.) The bell-circuit is designated by + and the locking-circuit by ⊖. When it is desirable to use a single-stroke bell only, as shown in Fig. 15, the local battery and secondary magnets are dispensed with, and under such circumstances the circuit is from the transmitter to one pole of magnets A', (not shown in Fig. 15,) thence through the other pole to the next box, connection being made between bell and main line by spring Q', spring-plate C', and arm F'. The bell-magnets being connected to screw F³, when the pin p' strikes the spring Q' and the armature-bar throws the arm F' up to contact with said screw F³ the main wire is grounded through the bell-magnets and the bell is struck. The connecting-wire to the bell for a moment becomes a part of the main circuit and the bell is rung from the transmitter.

Having thus described our invention, what we claim as new, and desire to secure by Letters Patent, is—

1. In a transmitter for an individual call system, a rotary metallic disk having an annular plate of insulating material, with points protruding through the same at regular intervals, and provided with insulating-eyelets fixed at points representing individual call-boxes, in combination with an arbor and an impelling-spring or its equivalent to rotate said disk, a locking-ratchet, a triple pawl-ratchet device, and a train of wheels connecting with a regulating fly or fan, as and for the purpose set forth.

2. In combination with the metallic disk having an annular ring and contact-points in said ring and means for rotating the same, the arm Q, insulated from its axis and adjustable, the arm P, the spring-arm J, and friction-spring R, with light and heavy batteries and circuit-connections, as and for the purpose specified.

3. The disk H, having an insulated rim or plate, I, and points or pins e in said plate, combined with the fixed arm P, spring-arm J, friction-spring R, and battery and circuits, as described, by means of which, in the movement of said disk, additional battery is switched on to close the circuit to the primary magnets of the call-box, as and for the purpose set forth.

4. In combination with the insulated spring-arm J and disk provided with the insulated rim, the metallic points, and a slot, M, the insulated plate N, by which the current from the main battery is grounded, as and for the purpose specified.

5. In an individual call-box, the combination, with the primary electro-magnets, the armature B', the bar or plate C', and retractile spring controlling the latter, of the pawl H', the ratchet-wheel Y, escapement-wheel Z, pawl I', and pallet K', adapted to engage with wheels Y and Z, as and for the purpose set forth.

6. In combination with the primary electro-magnets of an individual call-box, the vibrating armature and elastic bar associated therewith, and the pawl-and-ratchet mechanism, of the arm L' on shaft X and the holding spring-arm M', as and for the purpose set forth.

7. The combination of the armature and primary electro-magnets, the armature plate or bar C', the ratchet-wheel Y, having the pin P' and the spring-arm Q', the arm F', connected to C' at right angles thereto, and bracket G', having contact-points thereon, with circuits, as described, as and for the purpose set forth.

8. The combination, with the primary electro-magnets and armature, of the curved adjusting-bar $\dot{m}$, the spring $n$, and the set-screw to limit the forward throw of said bar, as and for the purpose specified.

9. In combination with the frame V and guides thereon, the adjusting-screw U', the sliding frame W, resting on said guides, and signal mechanism carried by said frame, as and for the purpose set forth.

10. The secondary electro-magnets V', the armature-bar Y', and armature fixed thereto, in combination with the notched horizontal lever Z', as and for the purpose set forth.

11. The mechanism which closes the secondary circuit to the bell from the impulses of the primary magnets by a current from the light battery and the additional battery, which consists of the pin P', attached to the ratchet-wheel Y, the connecting spring-arm Q', connected to upright X', and the arm F', connecting with one pole of said magnets through the bracket G' and set-screw fixed thereon, substantially as and for the purpose set forth.

12. The combination of the transmitter described with the call-box having primary and secondary magnets, pawl-and-ratchet mechanism, the spring-cushioning device $m$, the circuits connecting the transmitter with the call-box, and the circuits connecting the primary and secondary magnets, the locking mechanism for the bell-circuit, the vibrating bell, and the independent circuit connecting the bell, substantially as and for the purpose set forth.

13. The combination, with the unlocking switch-arm and battery and circuit-connections of the transmitter and main line, of the spring-arm M' and arm L' of the call-boxes, substantially as and for the purpose set forth.

In testimony that we claim the foregoing as our own we affix our signatures in presence of two witnesses.

WILLIAM H. PRENTICE.
SAML. H. BECKWITH.

Witnesses:
  H. B. McCreary,
  S. S. W. Jones.